US006935470B1

(12) United States Patent
Smith, Jr.

(10) Patent No.: US 6,935,470 B1
(45) Date of Patent: Aug. 30, 2005

(54) DISK BRAKE

(76) Inventor: Robert P. Smith, Jr., 6815 Smith Rd., Simi Valley, CA (US) 93063

( * ) Notice: Subject to any disclaimer, the term of this patent is extended or adjusted under 35 U.S.C. 154(b) by 0 days.

(21) Appl. No.: 10/334,608

(22) Filed: Dec. 31, 2002

(51) Int. Cl.[7] .............................................. F16D 65/10
(52) U.S. Cl. ......................... 188/218 XL; 188/264 AA
(58) Field of Search ..................... 188/218 XL, 264 A, 188/264 AA, 73.1, 251 M, 73.2

(56) References Cited

U.S. PATENT DOCUMENTS

| | | |
|---|---|---|
| 3,069,209 A | 12/1962 | Bauer |
| 3,708,042 A | 1/1973 | Krause |
| 3,712,427 A | 1/1973 | Cooke et al. |
| 3,800,392 A | 4/1974 | Cooke et al. |
| 3,804,213 A * | 4/1974 | Lucien et al. ............... 188/73.2 |
| 3,895,693 A * | 7/1975 | Lucien et al. ............... 188/71.1 |
| 4,018,311 A | 4/1977 | Tickle |
| 4,051,930 A | 10/1977 | Masclet |
| 4,132,294 A | 1/1979 | Poli |
| 4,263,992 A | 4/1981 | Moore et al. |
| 4,429,770 A * | 2/1984 | Weisbrod ................. 188/73.32 |
| 4,613,021 A | 9/1986 | Lacombe et al. |
| 4,745,996 A | 5/1988 | Wirth |
| 4,825,981 A | 5/1989 | Otto et al. |
| 4,830,164 A | 5/1989 | Hays |
| 4,846,326 A | 7/1989 | Tilton et al. |
| 4,860,872 A | 8/1989 | Flotow |
| 4,903,801 A | 2/1990 | Kobett |
| 4,907,677 A * | 3/1990 | Yamashita et al. ......... 188/73.1 |
| 4,951,793 A | 8/1990 | Hays |
| 4,977,991 A | 12/1990 | Mahoney |
| 4,982,818 A | 1/1991 | Pigford |
| 5,005,676 A | 4/1991 | Gassiat |
| 5,033,599 A | 7/1991 | Hays |
| 5,092,443 A | 3/1992 | Nomura |
| 5,099,960 A | 3/1992 | Alev |
| 5,123,514 A | 6/1992 | Gatins, Jr. |
| 5,143,184 A | 9/1992 | Snyder et al. |
| 5,158,165 A | 10/1992 | Flotow |
| 5,184,704 A | 2/1993 | Hays |
| 5,301,779 A | 4/1994 | Nash |
| 5,332,067 A | 7/1994 | Prud'homme |
| 5,355,986 A | 10/1994 | Biswas |
| 5,415,262 A | 5/1995 | Bernal et al. |
| 5,439,081 A * | 8/1995 | Glass .................... 188/264 CC |
| 5,454,990 A | 10/1995 | Chareire et al. |
| 5,558,186 A | 9/1996 | Hyde et al. |
| 5,634,535 A | 6/1997 | Fennell et al. |
| 5,638,932 A | 6/1997 | Mizukami |
| 5,655,637 A | 8/1997 | Hays |
| 5,709,288 A | 1/1998 | Riebe |
| D395,325 S | 6/1998 | Fukuda |
| 5,769,185 A | 6/1998 | Main et al. |

(Continued)

*Primary Examiner*—Robert A. Siconolfi
*Assistant Examiner*—Devon Kramer
(74) *Attorney, Agent, or Firm*—Marvin E. Jacobs

(57) ABSTRACT

A disk brake comprising: a disk, which comprises a plurality of coaxially disposed arcuate shaped recesses and a plurality of radially disposed channels; arcuate shaped pads matingly mounted therein the arcuate shaped recesses; a caliper comprising caliper pads, the caliper pads mounted adjacent and thereabout the disk mounted arcuate shaped pads. The disk brake has improved braking efficiency, does not become overheated or warp, is light weight, durable, long lasting, and may be manufactured or retrofit with replacement parts quickly, easily, and efficiently.

17 Claims, 5 Drawing Sheets

U.S. PATENT DOCUMENTS

| | | |
|---|---|---|
| 5,769,973 A | 6/1998 | Smith, Jr. |
| 5,803,210 A | 9/1998 | Kohno et al. |
| D402,299 S | 12/1998 | Mizukami |
| 5,857,546 A | 1/1999 | Hofmann et al. |
| 5,857,550 A | 1/1999 | Atmur et al. |
| 5,868,888 A | 2/1999 | Don et al. |
| 5,957,251 A | 9/1999 | Jones et al. |
| RE36,363 E | 11/1999 | Tilton et al. |
| 6,035,987 A | 3/2000 | Fukuda |
| 6,070,707 A | 6/2000 | Hofmann et al. |
| 6,077,607 A | 6/2000 | Zornik |
| 6,155,397 A | 12/2000 | Killian |
| 6,241,055 B1 * | 6/2001 | Daudi .................... 188/73.35 |
| 6,247,382 B1 | 6/2001 | Umeki et al. |
| 6,308,808 B1 | 10/2001 | Krenkel et al. |
| 6,334,515 B1 | 1/2002 | Martin |
| 6,376,431 B1 | 4/2002 | Matsumoto et al. |
| 6,450,303 B1 | 9/2002 | Keck et al. |

\* cited by examiner

DISK BRAKE

BACKGROUND OF THE INVENTION

1. Field of the Invention

The present invention relates generally to disk brakes and more particularly to disk brakes having carbon—carbon friction material, and the like.

2. Background Art

Disk brakes and the like have been known. Brake rotors are typically attached to the automobile or vehicle's axles. As the automobile or vehicle travels, the brake rotors rotate with the wheels of the automobile or vehicle. Brake caliper assemblies, having brake pistons and brake pads, are rigidly mounted to the automobile or vehicle's frame. Upon application of the brake pedal, hydraulic fluid drives the brake pistons outward from cylinders in the caliper assemblies, forcing the brake pads to engage the rotors of the disk brakes, causing the frictional braking force that stops the automobile or vehicle from traveling.

Such disk brakes, particularly in automobiles and other similar vehicles, typically required the application of asbestos based friction materials against steel or cast iron rotors to stop the automobile or vehicle. Such braking is often applied in intermittent and irregular intervals, which results in substantial amounts of kinetic energy being transferred to both the pads and the steel or cast iron rotors in the form of friction heat, with the pads and rotors reaching temperatures in excess of 670K. With braking in intermittent and irregular intervals at such high heat levels, the pads often crack and deteriorate, as a result of repeated application of heat and differences in heat expansion coefficients of the pads and associated back plates, and the rotors often warp, because of the variation of heat applied to different portions of the rotors, the outer portions of the rotors often being subjected to a substantially higher temperature than the inner portions of the rotors.

Since the discovery of the toxic effects of asbestos, brake pad construction has shifted toward the use of semi-metallic or non-asbestos organic composite pads. However, disk brakes having the semi-metallic or non-asbestos organic composite pads, typically have problems, such as noise, shudder, vibration, short lifetimes of the pads and rotors, and aesthetic problems, such as brake pad dust on the wheels. Rotors have also tended to warp, owing to greater heat generation, as a result of the use of such brake pads. In addition, such pads wear out quickly, requiring the use of hydraulic brake pistons, which have a long travel to compensate for rapid wear of the brake pads, which necessitates the use of a larger caliper assemblies and larger pistons, which adds weight to the disk brakes.

With the introduction of aluminum alloy rotors, in order to lighten the automobile or vehicle, and improve fuel efficiency, additional problems have been introduced. Aluminum alloy rotors tend to scuff and score more easily, thus, making it less feasible to replace cast iron or steel rotors with aluminum rotors. The coefficient of friction of the pads was reduced, in order to be compatible with the aluminum alloy rotors, which resulted in decreased braking efficiency. Abrasive, materials, such as alumina, were then introduced to the friction material, which resulted in an increase of the coefficient of friction and an increase in braking ability; however loading of the back plate increased, and the back plate tended to become overheated.

There is thus a need for a disk brake that has improved braking efficiency, does not become overheated or warp, is light weight, durable, long lasting, and may be manufactured or retrofit with replacement parts quickly, easily, and efficiently.

Different disk brakes have heretofore been known. However, none of the disk brakes adequately satisfies these aforementioned needs.

Brakes, friction disks, clutches, and flywheels have been disclosed.

U.S. Pat. No. 5,558,186 (Hyde, et al.) discloses a friction disk assembly, which comprises an annular structural carrier including a plurality of recessed regions and torque drive notches spaced around its circumferential direction, and a friction lining mounted on the carrier, the friction lining having a flat wear (rubbing) face and an obverse face including raised areas corresponding to and matingly engaging the recessed regions of the carrier to prevent rotation of the lining relative to the carrier. The carrier may be formed of steel or other suitable structural material. The lining may be formed of virgin or recycled carbon, ceramic or other suitable friction material. The lining may be retained to the carrier by rivets, and may be provided with a structural casing configured to engage the recessed regions of the carrier. The assembly may be refurbished by simple replacement of the worn lining. The carrier and the lining may be formed as unitary annular members or as segments of annular members.

U.S. Pat. No. 3,708,042 (Krause) discloses a friction disk for a disk brake having a plurality of interleaved brake rotor and stator disks, which are forced together to provide a friction effect. The rotor is provided with a plurality of segments, each of which includes a carbon block having friction material pads fixedly secured to opposite faces thereof. The segments are attached to a ring or strap, which holds the segments in fixed spaced-apart relationship to define an annular rotor disk.

U.S. Pat. No. 5,709,288 (Riebe) discloses a friction assembly, comprising an annular structural carrier, including a plurality of recessed and/or raised regions and torque drive notches spaced around its circumferential direction, and a segmented friction lining mounted on the carrier. Each segment of the friction lining comprises a clamshell-shaped friction cup including a pair of cup members containing a puck of friction material, each pair of cup members being joined by a deformable strap and together defining a U-shaped configuration. The obverse side of each cup member includes projections and/or depressed areas that are complementary in size, shape and location to the recessed and/or raised regions of the associated carrier operatively engaged therewith, to prevent movement of the lining relative to the carrier during a braking event. The carrier may be formed of steel or other suitable structural material. The lining may be formed of suitable friction material, e.g. sintered metal. The lining may be retained to the carrier by rivets that pass through lugs extending from the cup members. The friction pucks are provided with a structural casing configured to engage the recessed and/or raised regions of the carrier. The assembly may be refurbished by simple replacement of the worn lining together with its associated structural casing.

U.S. Pat. Nos. 3,712,427 and 3,800,392 (Cooke, et al.) disclose a brake disk assembly in the form of a carbon or graphite disk, which is provided on both sides with thin wear plates of carbon or graphite material. The plates are either in segmented or full circle form, and are secured to the core by rivets and bushings, which also secure keyway drives of the disks.

U.S. Pat. No. 4,613,021 (Lacombe, et al.) discloses a disc brake disk comprising a core designed to withstand mechanical stresses, the core including a hub, a plurality of spokes surrounding the hub and hooks at the end of the spokes, each of the spokes having two opposite flat faces and two opposite edges, removable friction pads fitted on both sides of the core, each of the friction pads including a plurality of annular sectors, each sector having an axially outside friction surface and an axially inside mounting surface with lands and recesses, each sector having a radially outer edge with an oblique surface and a radially inner edge with an oblique surface, the hooks cooperating with the oblique surfaces of the outer edges of the sectors to form stops against both axial and radial movement of the sectors, the lands of the sectors on each side of the core bearing axially against one another back to back, each sector covering two angular spaces between spokes by overlapping one middle spoke and halves of two side spokes, the lands and recesses comprising a radial center slot having a bottom and edge walls and two radial half-width slots in the ends of the sector, the edge walls cooperating with the edges of the middle spoke for radial guidance and annular locking of the sector, a clearance being left between the bottom and the flat surface of the middle spoke, the half-width slots leaving room with clearance for the side spokes, the sectors on one side of the core being offset circumferentially relative to the sectors on the opposite side of the core by a half-sectors breadth and spring rings attached to the hub pushing elastically against corresponding oblique surfaces of the inner edges of the sectors so as removably to mount the sectors on the core.

U.S. Pat. No. 5,769,185 (Main, et al.) discloses carbon brake disc assemblies and methods for making the same, which allow for increased carbon utilization. In one embodiment of the invention, worn or spent discs from a carbon brake disc assembly are used to fabricate new brake discs. The separate discs, individually unsuited for further use in a brake assembly, are secured together with like wear material and subjected to chemical vapor infiltration to configure a disc suitable for use as a new disc. In other embodiments, previously used discs or new carbon material is employed to configure wear pads or wear discs, which are affixed to opposite sides of a carrier plate, and then subsequently used in a brake disc assembly. In all of the embodiments, carbon screws or threaded rods are employed to hold the components of the disc together. Such carbon screws or threaded rods are fabricated from otherwise worn or spent carbon discs or from new carbon.

U.S. Pat. No. 4,825,981 (Otto, et al.) discloses an axially split brake disk, which includes two brake bands, that form a brake ring, and which are interconnected by ribs. The brake disk further includes two brake ring halves, that are separated by concentric and radially extending seams of division, in each of which one of the brake ring halves is provided with a projection that extends in a concentric direction, while the other brake ring half is provided with a corresponding U-shaped recess, that accommodates the projection. The width of the projection is less than the width of the brake ring, as measured in a radial direction. The projection of the one brake ring half, as well as that portion of the other brake ring half in which the recess is provided, are provided with corresponding radially extending bores for receiving a holding mechanism, such as a sleeve-like or rod-like member, that is provided with pin-like elements, for preventing the holding mechanism from shifting in a radial direction relative to the brake ring halves.

U.S. Pat. No. 4,018,311 (Tickle) discloses a rotor and braking ring disc assembly, for use in a railway disc brake, comprising a plurality of arcuate elements or segments of a braking ring, which are attached to the rotor so that each element or segment can thermally expand and contract relative to the rotor, and pairs of circumferentially spaced locating abutments for preventing radial inward and outward movement of the element or segment relative to the rotor at predetermined locations, which are selected, so that when the element undergoes thermal expansion or contraction with respect to the rotor, there is no movement of the element into or out of engagement with the abutments. The abutments may take the form of radial projections on the element or segment or rotor, which projections are urged into engagement with a groove in the rotor or disc element, respectively by further abutments, such as in the form of camming wedges or springs. Alternatively, the abutments may be lateral projections on the rotor, which are a sliding fit in elongated grooves in the element or segment.

U.S. Pat. No. 4,132,294 (Poli) discloses a brake disc with replaceable linings, for brake-discs, comprising a hub provided with a circumferential radial flange structure extending therefrom, and having front and rear annular faces; at least two sector shaped lining parts, which together form an annular assembly, each part being of monolithic construction, and including confronting front and rear sector-shaped linings, all of the linings together forming front and rear annular linings, the outer surfaces of which are acted on by braking jaws, during use of the assembly, each of the parts being removably fitted over the flange structure in concentric relationship with the hub, so that the front and rear faces of the flange structure lie between the opposed surfaces of the confronting front and rear sector-shaped linings, the linings having radially extending inner ribs projecting therefrom, so as to form cooling passages, open at both their radial inner and outer ends, at least some of the ribs having edges, which serve as guides for the lining parts, during fitting of the latter over the flange in a radial direction, the rib edges engaging the flange structure in the completed brake disc assembly; and for each sector-shaped lining part, a single removable connecting element extending parallel to the axis of the hub and connecting the respective lining part with the flange structure, each of the connecting elements being located approximately at the center of the respective lining part.

U.S. Pat. No. 4,903,801 (Kobelt) discloses an internally air cooled brake disc assembly, manufactured by casting in small pieces, for eliminating problems associated with casting large discs with integral air cooling passages. The assembly has a main disc member and a plurality of disc segments secured to the main disc member. The disc segments are separate entities, and can expand and contract independently of each other, thus, reducing distortion from thermal effects. Assembled outer surfaces of each disc segment are generally flat, and provide an annular surface to be swept by brake pads. The inner surface of each disc segment has a plurality of ridges and at least one groove, for spacing the ridges apart. The ridges contact the main disc member, so that at least one passage is formed between the disc segment and the disc member, to receive a flow of cooling air. When the disc segments are secured on each side of the main disc member, the disc assembly has a plurality of cooling passages on each side of the main disc member. An optional external fan means can be provided adjacent inner ends of each disc segment, to provide a forced flow of air over the outer surfaces of the disc.

U.S. Pat. No. 6,334,515 (Martin) discloses a brake disk for disk brakes of vehicles, which is made of a material of the carbon group, the brake disk being formed as a ventilated brake disk, made up of two individual friction rings, which are undetachably connected with one another. The two friction rings are connected with one another by way of pins, which have a thickened center part and end parts, which are set off thereto. The end parts are fitted into respective bores in the friction rings.

U.S. Pat. No. 5,005,676 (Gassiat) discloses an improved rotor for a disk brake, having a multi-piece construction. The rotor has a central web extending around a driving drum portion, such that the web defines several generally radially extending cooling passages. The central web is mounted on the driving drum portion, so as to be capable of sliding laterally, but may not rotate relative to the driving drum. Friction elements, completely separate from the central web, are located on either side of the central web, and are mounted on the driving drum, so as to be also capable of lateral movement. The friction elements are also prevented from rotating relative to the driving drum portion of the rotor.

U.S. Pat. No. 4,745,996 (Wirth) discloses a brake ring for brake disks, especially disk brakes for rail vehicles, consisting of two annular bodies arranged adjacently at a distance from each other, having stud bolts bridging the distance and rigidly connected with the annular bodies. The stud bolts are so arranged, for the purpose of the most even distribution possible, that the axes of the stud bolts extend through the intersecting points of three systems of straight lines, extending in one radial plane. The straight lines of the first system are parallel, and are at an equal distance from each other; the second system of straight lines is formed by a rotation of 60 degrees from the first system of straight lines; and the third system of straight lines is formed by a rotation of 120 degrees from the first system of straight lines. Preferably, the ratio of the distance of the stud bolt axes and the diameter of the stud bolts is approximately 1.7. The brake ring has only minor aeration losses, but high heat transmission by cooling air. When the brake ring heats up, the stresses within the annular bodies and the stud bolts are evenly distributed, and the risk of fracture is reduced.

U.S. Pat. No. 4,263,992 (Moore, et al.) discloses a fabricated disc brake rotor assembly, in which a brake disc rotor is formed from two disc shaped members, with each disc having a flat surface and integrally formed fins extending from an opposing surface thereof. The ends of the fins are welded together to form the rotor. The fins of one member are welded to a convoluted outer rim section of a hat, which is secured to a wheel bearing assembly.

U.S. Pat. No. 5,332,067 (Prud'homme) discloses a disk brake pad device, which includes a carbon—carbon lining pad. A pad is attached to a caliper, and at least one pad positioning surface of the caliper has at least one pad actuating piston emerging therefrom. A first plate element of heat-insulating material, called a screen element, is located against the positioning surface, and at least one second element of heat-insulating material, called a spacer element, of adequate thickness, having reduced frontal contacts is located against the first element. A carbon—carbon lining pad of high-temperature friction material is located against the second element. The first element and/or the second element acts to retain the lining pad and to fix the first element and/or the second element to the caliper.

U.S. Pat. No. 4,051,930 (Masclet) discloses a disc brake with graphite friction linings. The disc brake comprises a rotor and a stator, wherein the rotor and/or the stator includes a mounting member provided with a friction lining formed at least in part by a plurality of graphite plates, each plate having two flat side faces and a peripheral surface, which is perpendicular to the two flat side faces, each plate being received in a recess in a side face of the mounting member, each recess having a flat bottom surface, and being of a depth less than the thickness of the plate, the side wall of the recess being parallel to the peripheral surface of the plate and spaced from the peripheral surface of the plate by a distance greater than that necessary to permit thermal expansion and contraction between the mounting member and the plate. The graphite plates of one of the rotor and the stator are formed of polycrystalline graphite, and the other of the rotor and the stator is formed and/or has graphite plates formed of structural graphite.

U.S. Pat. No. 4,982,818 (Pigford) discloses a cyclic brake disc overhaul technique and structure. The cyclic carbon brake disc overhaul technique comprises the steps of splitting a worn carbon disc into two equal disc halves, machining the disc halves to a predetermined axial thickness, and then bonding the disc halves of predetermined thickness to a core member. The disc halves may include drive regions at respective ends thereof, or the halves may have the drive regions removed therefrom. The core member may have axially extending drive portions, such that the disc halves of reduced radial length define wear grooves with the drive portions.

U.S. Pat. No. 6,308,808 (Krenkel, et al.) discloses a brake disk for a vehicle disk brake, in which a material from the carbon group is used for an internally ventilated disk brake. Individual components, such as friction rings and ribs, are manufactured individually or partially together, and can be fastened to one another, using an unreleasable connection, such as high temperature welding or gluing.

U.S. Pat. No. 5,099,960 (Alev) discloses a composite brake disk and method of extending the braking service life thereof. The composite brake disk provides an integral brake disk, comprising two brake disks, each of the brake disks having a disk thickness of one-half the design required disk thickness, and the two disks being clamped together in planar face-to-face orientation, by fasteners to form the integral brake disk. The integral brake disk has an inboard-facing brake wear surface, provided by a wear surface of a first of the combined brake disks, and an outboard-facing brake wear surface, provided by the second of the combined brake disks. The integral brake disk is put into braking service for a first period after which refurbishment is required. The integral brake disk is refurbished by declamping the two disks and grinding the worn wear surfaces to planar specification. The two disks are recombined at the ground planar surfaces, and reclamped to form a new integral brake disk. The refurbished integral brake disk has an inboard-facing brake wear surface, provided by the second of the two disks, and an outboard-facing brake wear surface, provided by the first of the recombined disks, and may be used for an additional period of braking service.

U.S. Pat. No. 5,803,210 (Kohno, et al.) discloses a disk pad type brake comprises a rotor disk provided with a carbon—carbon composite material (a) as a friction member, and at least one pad provided with a carbon—carbon composite material (b) as a friction member, wherein the difference in thermal conductivity between the materials (a) and (b) is 30 to 450 W/m.multidot.K in the radial direction; and a multi-disk type brake comprises at least one rotor disk provided with a carbon—carbon composite material (c) as a friction member, and at least one stator disk provided with a carbon—carbon composite material (d) as a friction member, wherein the difference in thermal conductivity between the materials (c) and (d) is 30 to 450 W/m.multidot.K in the radial direction.

U.S. Pat. No. 6,450,303 (Keck, et al.) discloses a brake disc for motor vehicles, with a bowl-shaped brake-disc chamber having a wall region and a bottom region, and with a disc-shaped friction ring surrounding the brake-disc chamber coaxially with respect to a common mid-axis, the friction ring having, on its inner circumference, clearances, into which projections formed on the wall region of the brake-disc chamber engage for the play-free transmission of a torque acting on the friction ring to the brake-disc chamber.

U.S. Pat. No. 6,077,607 (Zornik) discloses a brake/clutch disc, such as for a vehicle. In known SiC/C—C composites, the SiC layer is implemented as a diffusion layer, so that Si occurs even comparatively far within a C—C basic body having an SiC boundary layer. The brake/clutch disk is directed to friction discs, consisting of an SiC/C—C composite, and having essentially the mechanical properties of C—C discs, but a longer service life and a broader field of use than said C—C discs. This is achieved by a graphitized, machined basic body, provided with an SiC coating, consisting of a subsequently applied melt. In addition, a manufacturing method for such discs is provided.

U.S. Pat. No. 5,634,535 (Fennell, et al.) discloses a composite brake disc, such as a carbon composite brake disc having reinforcement provided by layers of carbon fiber material, in which the drive region is provided with additional reinforcement in addition to that of the friction region, by laying or otherwise providing additional fiber reinforcement material substantially uniformly in the drive region.

U.S. Pat. No. 5,143,184 (Snyder, et al.) discloses a carbon composite brake disc, with positive vibration damping, in which a carbon composite aircraft brake disc is manufactured to include an insert member, which effects positive vibration damping of the disc during operation of the brake.

U.S. Pat. No. 6,376,431 (Matsumoto, et al.) discloses reduced wear carbon brake material, which is carbon/carbon composite, comprising crystalline silicon carbide, which is essentially uniformly distributed on both internal and external surfaces of the composite in a low concentration, as well as a process for producing the composite and the use of the composite in brake materials for industrial roll goods, automotives, trucks, trains and aircrafts. It has been discovered that small amounts of crystalline silicon carbide uniformly distributed throughout the carbon/carbon composite results in reduced wear with either no change or a slight increase in the friction coefficient.

U.S. Pat. No. 5,868,888 (Don, et al.) discloses a method for near net-shape fabrication of friction disk ring structures, in which trapeziform paneled strips of friction paper or cloth are folded to make uniform 2-ply disks.

U.S. Pat. No. 5,454,990 (Chareire, et al.) discloses a process for the production of a part, particularly a carbon—carbon brake disk and to the part obtained In a process for manufacturing a carbon—carbon component, in particular a brake disk, a porous substrate in the shape of a brake disk is formed exclusively from carbon fibers. Holes, having axes parallel to the axis of rotation of the disk, are made in the substrate and are arranged on concentric circles centered on the axis of rotation. Areas free of holes are provided around keyways in the disk. The substrate is then impregnated by chemical vapor phase deposition. The holes in the substrate reduce the path of the gas in the substrate.

U.S. Pat. No. 3,069,209 (Bauer) discloses a method of bonding a bimetallic casting, the bond exhibiting improved heat transfer characteristics, and allows reduction in weight of certain components, such as brake drums.

U.S. Pat. No. 5,957,251 (Jones, et al.) discloses brake or clutch components having a ceramic-metal composite friction material, in which a braking component, such as a brake pad, brake rotor, brake drum or clutch disk is comprised of a metal substrate, having a friction material laminated on at least a portion of at least one face of the metal substrate, the friction material being a ceramic-metal composite comprised of a metal phase and a ceramic phase dispersed within each other, wherein the ceramic phase is present in an amount of at least about 20% by volume of the ceramic-metal composite. In particular, the braking component is a metal substrate, such as aluminum, having laminated thereto a ceramic-metal composite of a dense boron carbide-aluminum composite having high specific heat and tow density.

U.S. Pat. No. 5,857,550 (Atmur, et al.) discloses a polymer derived fiber reinforced ceramic matrix composite clutch, in which a structural fiber reinforced ceramic matrix composite (FRCMC) material is adapted for clutch use. The entirety of the frictional components of a clutch mechanism or only particular components thereof can be made of the FRCMC material. One embodiment has integrally molded fiber reinforced ceramic matrix composite clutch friction pads, forming the friction surfaces of metal clutch parts. Clutch components exhibiting a higher temperature and wear-resistance.

U.S. Pat. No. 5,655,637 (Hays) discloses an automotive clutch with improved heat shield, having a pressure ring, preferably formed of aluminum, with a heat shield, that includes a thin outer metallic ring, preferably of steel, which is laminated to a layer of an adhesive resin, that contains metallic elements, which are in substantially direct heat exchange between the outer steel ring and the aluminum pressure ring. For this purpose, copper screen of suitable mesh, from 10 to about 20 U.S. Standard, is embedded in the adhesive resin layer, reinforcing the adhesive layer, and providing a controlled degree of direct heat transmission from the steel ring to the aluminum ring. In preferred embodiments, the attachment of the steel ring to the pressure ring is enhanced by a plurality of countersunk, flush head fasteners, which are spaced about the periphery of the ring in a regular geometric array. Optionally, a plurality of slots are provided in the steel ring to compensate for the differences in thermal expansion of the steel ring and the aluminum pressure ring.

U.S. Pat. No. 4,830,164 (Hays) discloses a heat puck for clutches and flywheels, which has a trapezoidal shape with a steel base plate and a thick layer of a high heat capacity material such as copper. The heat puck is attached to either or both the pressure plate and flywheel of an otherwise conventional automotive clutch assembly. Preferably a circular array of heat pucks are mounted on a respective plate or flywheel. The puck is mounted with a large diameter shoulder member that extends through an aperture in the puck, and is received in an aligned receptacle in the surface of the plate or flywheel. A screw or rivet fastener extends through the shoulder member, puck and plate or flywheel to retain the assembly. The shoulder member provides the necessary torque resistance to the assembly, protection the fastener from stress failure.

U.S. Pat. Nos. RE37,548 and 5,184,704 (Hays) disclose a conversion for a clutch of a motor vehicle, which uses a conventional Belleville spring to bias a pressure plate and clamp a clutch disc between the pressure plate and the flywheel of the vehicle. Frictional linings of the conventional clutch are substituted by frictional linings, which are preferably located at optimum geometric spacing, and which have from 30–70 percent less surface area for frictional engagement than that conventionally furnished with the clutch. The conversion is particularly applicable to upgraded performance cars.

U.S. Pat. No. 5,355,986 (Biswas) discloses a clutch and disc brake friction assembly, for use on medium and heavy duty vehicles, which includes a metallic shoe having an exposed backing surface provided with a plurality of relatively spaced protuberances projecting therefrom. A sheet metal attachment lamina overlies the backing surface, and is provided with a plurality of holes through which the protuberances extend. Subsequent to the distal ends of the protuberance having passed through the holes, the holes are enlarged thereby affixing the attachment lamina to the backing surface. The attachment lamina has a plurality of openings relatively arranged to form a grid-like configuration. The openings are separated from one another by narrow elongated segments, each having a V cross-sectional configuration, with the sides thereof diverging from a shoe backing surface. A high temperature adhesive lamina overlies the backing surface and the divergent sides of the narrow elongated segments of the attachment lamina. A friction lamina overlies the adhesive lamina and the attachment lamina, whereby the divergent sides of the elongated segments and the adhesive lamina become embedded in the friction lamina.

U.S. Pat. No. 5,158,165 (Flotow) discloses a backing plate for connection to a clutch disc, which includes a pair of spaced friction material portions (or pads). A central channel extends between the two portions to allow air to flow over and cool a central area of the friction material. Clearances are defined at radially inner and outer areas of the channel and receive rivets to secure the backing plate to a clutch disc. The rivets are positioned radially between the radially inner and radially outer edge of the friction material, such that the backing plate is firmly secured to the clutch disc to prevent bowing. The improved backing plate ensures that the backing plate remains firmly secured to the clutch disc, and that the friction material is adequately cooled such that it efficiently transmits rotational forces from a drive source to a driven shaft.

U.S. Pat. No. 6,247,382 (Umeki, et al.) discloses a composite material flywheel device, which has a ring made from a composite material of carbon fiber reinforced plastics and a spoke member inserted in the ring. The spoke member is made from the fiber reinforced plastics having a lower modulus of elasticity than that of the ring. A tapered bush is press-fitted into a center portion of the spoke member. Both of the tapered bush and the spoke member are tightly fixed on a shaft by a first spring supported by a holder, and by a second spring urging the holder, so as to prevent vibrations, due to looseness thereof.

U.S. Pat. No. 5,123,514 (Gatins, Jr.) discloses a clutch or brake system for a heavy duty vehicle, having an assembly which includes a shoe having an exposed surface on which is attached a carrier member. A friction liner is molded onto the carrier member, which is provided with a plurality of apertures, each having a peripheral flange embedded into a concealed surface of the liner. The attachment of the carrier member to the shoe exposed surface permits relative adjustment therebetween, when the assembly is in a braking or clutching mode, so as to compensate for any differential in coefficients of thermal expansion between the shoe and the carrier member on which the liner is molded.

U.S. Pat. No. 5,092,443 (Nomura) discloses a clutch disc assembly in which facings comprising cerametallic pads secured to back plates are secured to opposite faces of a plate at an outer peripheral part of a clutch disc, characterized by that a heat insulating material is held between the plate and a back plate on the opposite faces, the insulating material having a thickness gradually increasing from a radial inside to a radial outside of the clutch disc. The clutch disc assembly is directed toward preventing failure in engagement and disengagement of the clutch, by preventing a strain caused by heat produced on the part of the plate on which the facings are provided.

U.S. Pat. Nos. 5,033,599 and 4,951,793 (Hays) discloses a clutch with dissimilar frictional facings and centrifugal assist, in which frictional engagement faces of a clutch are provided with an organic composite facing and a sintered metal facing. The benefits of both types of facings are obtained without many of the disadvantages that formerly plagued the use of these facings. The organic composite facing provides the low temperature service for the clutch, with a suitably high coefficient of friction, which is relatively constant from ambient to several hundred degrees F. The sintered metal facing provides high temperature service for the clutch. Thus, when the organic composite facings reach their maximum service temperature of around 500 degrees F., the sintered metal facings provide their optimum coefficient of friction, resulting in a subassembly in which the overall or average coefficient of friction remains substantially constant from ambient temperatures to the maximum service temperature of the sintered meta coatings, in excess of 900 degrees F. The result, when incorporated in an automotive clutch, is a clutch having a smooth, non-vibrational action, which does not exhibit premature wear and failure.

U.S. Pat. Nos. RE36,363 and 4,846,326 (Tilton, et al.) discloses a carbon to carbon friction clutch, in which carbon input disks are coupled to a flywheel by radial slots in their peripheries. Carbon input disks are coupled to a drive shaft by means of inner, radial slots and a metallic hub which contains slot-matching fingers. The input and output disks, as well as the hub, are axially free standing when the clutch is disengaged. The design distributes load more uniformly over the carbon plates than previous devices and allows greater service life of the clutch.

U.S. Pat. No. 5,769,973 (Smith, Jr.) discloses a high performance automotive clutch with modified pressure plate for sustained increased spring force. A Belleville spring pressure plate of increased height, for use in a high performance clutch assembly, exerts a greater force than the original height plate, is usable without modification of the original clutch, and is longer lasting in service, after being thermally conditioned to a martensitic state, to lose the memory of its original, lower height, and being stress tempered before being set in a new, increased height shape.

U.S. Pat. No. 5,415,262 (Bernal, et al.) discloses a carbon to carbon friction mechanism, which includes a lightweight pressure plate directly mounted to an adjacent carbon plate, so that the pressure plate is kept concentrically aligned during operation of the mechanism. The directly mounted pressure plate and adjacent carbon plate may be used as components of a carbon to carbon friction clutch. Sufficient clearances are provided between the pressure plate and its adjacent carbon plate, to allow for thermal expansion of the materials used for the pressure and carbon plates.

U.S. Pat. No. 6,155,397 (Killian) discloses a clutch driven disc assembly, which includes a hub and an annular spring plate fixed to the hub. A friction disc assembly is mounted concentric with an axis of rotation of the hub and is rotatably relative to the spring plate. A plurality of drive springs are operably disposed between the spring plate and the friction disc assembly. The friction disc assembly further includes a reinforcing plate and a substantially annular disc fixed to the reinforcing plate. A friction material button is fixed to the substantially annular disc. The friction material button has a metallic friction material cookie with at least three apertures. A backer plate is fixed to the friction material. The backer plate covers the apertures in the friction material cookie. At least three spot welds are within three corresponding apertures in the cookie. At least one of the welds is offset from a line joining two others of the welds. The welds join the substantially annular disc and the backer plate, in turn fixing the friction material button to the substantially annular disc.

U.S. Pat. No. 4,860,872 (Flotow) discloses a friction disc assembly, which includes a plurality of one piece or unitary friction elements, each containing a pair of opposed planar friction surfaces. Each element is adapted for being supported within an opening of a clutch driven disc, wherein a pair of backing plates virtually supports each disc, by trapping same within pairs of aligned openings. In a preferred form, the backing plates comprise an interference fit with the axially aligned boundaries of associated friction surfaces, and rivets, which hold the backing plates rigidly to the driven disc, are spaced from and hence out of contact with the friction elements. In a preferred form, each friction element includes a radially extending tongue, which has a thickness equal to the thickness of the driven disc.

U.S. Pat. No. 4,977,991 (Mahoney) discloses a multiple disc clutch, which comprises interleaved first and second sets of friction discs mounted for rotation of one disc set relative to the other disc set about an axis, the disc sets being shiftable axially of each other; a flywheel plate for mounting in driving engagement to a source of torque; and a plurality of separately formed dowels, for securing to the flywheel plate at its circumference, at circumferentially spaced locations, the dowels projecting axially therefrom through corresponding circumferentially spaced apertures adjacent the radially outward edge of the second disc set, for driving engagement with the second disc set, the number and spacing of the dowels being chosen with respect to the circumference of the second disc set, to promote air cooling of the multiple disc clutch, by circulation of air around the dowels and between discs of the disc sets.

U.S. Pat. No. 6,070,707 (Hofmann, et al.) discloses a friction clutch, in which an axial play is provided between an inner disk and a hub of a clutch disk. The axial play can be influenced by a device during assembly of the friction clutch in an engine and transmission of a motor vehicle drive train, such that the hub is displaced, within the axial play, into the position in the axial play, which lies closest to a flywheel of the friction clutch.

U.S. Pat. No. 5,857,546 (Hofmann, et al.) discloses a multiple-disk friction clutch, especially for motor vehicles, with a hub which has an internal toothing and can be placed on a gear shaft, so as to be rotationally fixed relative thereto. At least two clutch disks are connected with the hub, so as to be rotationally fixed relative thereto and project radially beyond the hub. A stop, which guides the hub axially relative to the clutch disks, is provided between the clutch disks. The hub is formed of two parts, and includes a hub body having an outer toothing and a hub ring, which has the same outer toothing, and sits on a radial shoulder of the hub body. The outer toothing of the hub ring is offset by one tooth relative to the toothing of the hub body, to form the stop for the clutch disks. The hub body and the hub ring are connected with one another, so as to be rotationally fixed relative to one another.

U.S. Pat. No. 6,035,987 (Fukuda) discloses a multi-plate clutch of a boss driving type, with structure to make it easy to replace a boss, and to limit the number of parts. The clutch includes a flywheel, a boss, a clutch cover assembly, and input-output friction members, such as clutch disks, an intermediate plate, and a pressure plate. The boss is detachably coupled to the flywheel, and includes an annular portion and a plurality of columnar portions, which are formed integrally with the annular portion. The columnar portions extend in an axial direction from the annular portion. Each of the columnar portions is disposed circumferentially next to one another in a circular pattern, with a radial pass-through space formed therebetween. The clutch cover assembly includes a clutch cover, which is detachably coupled to the boss, a pressure plate, and a diaphragm spring assembly. The clutch disks and the intermediate plate are disposed between the friction face and the pressure plate.

U.S. Pat. No. D395,325 (Fukuda) also discloses a friction clutch, especially for automotive racing applications.

U.S. Pat. No. 5,638,932 (Mizukami) discloses a dry multi-disk clutch. A clutch cover assembly is used with clutch friction disks of a dry multi-disk clutch, and is provided with a diaphragm spring, a clutch cover and a support structure. The outer periphery portion of the diaphragm spring loads the clutch friction disks. The support structure includes a first annular disk-like annular ring member possessing a first ring main body, which contacts a portion of the diaphragm spring from the clutch cover side, and a seating portion, which extends from the first ring main body, and seats against the clutch cover, a second annular disk-like annular ring member possessing a second ring main body, which contacts the diaphragm spring on the side opposite the first annular disk-like annular ring member, and bolts for fixing the first and second annular disk-like annular ring members to the clutch cover. One purpose of the invention is to suppress clutch cover wear, caused by annular disk-like wire rings. A hub flange having a boss and a flange extending from the boss to the outer periphery, where a drum-shaped element is formed, which extends axially to opposite sides of the outer periphery of the flange. Plural annular drive plates and plural annular driven plates are disposed between a flywheel and the clutch cover. In the flange, passage openings are formed, which provide air flow. In the two axially projecting portions of the second drum-shaped element, there are formed air passage holes, the openings and holes preventing the temperature in the friction disks in the dry multi-disk clutch from rising excessively.

U.S. Pat. No. D402,299 (Mizukami) also discloses a dry multi-disk clutch, especially for automotive racing applications.

U.S. Pat. No. 5,301,779 (Nash) discloses a friction clutch, which includes a hub and driven plate assembly, in which three carbon driven plates are mounted on a hub, the hub having radially outwardly extending splines thereon, and the driven plates having radially inwardly extending teeth, for engagement with the splines, such that the hub can slide axially relative to the driven plates, when the driven plates are held axially by driving plates. Roll pins are each held in holes through two adjacent splines, such that the roll pins are between the driven plates, and limit axial movement of the hub relative to the driven plates.

For the foregoing reasons, there is a need for a disk brake that has improved braking efficiency, does not become overheated or warp, is light weight, durable, long lasting, and may be manufactured or retrofit with replacement parts quickly, easily, and efficiently.

SUMMARY

The present invention is directed to a disk brake that has improved braking efficiency, does not become overheated or warp, is light weight, durable, long lasting, and may be manufactured or retrofit with replacement parts quickly, easily, and efficiently.

A disk brake having features of the present invention comprises: a disk comprising a plurality of coaxially disposed arcuate shaped recesses and a plurality of radially disposed channels; arcuate shaped pads matingly mounted therein the arcuate shaped recesses; a caliper comprising caliper pads, the caliper pads mounted adjacent and thereabout the disk mounted arcuate shaped pads.

DRAWINGS

These and other features, aspects, and advantages of the present invention will become better understood with regard to the following description, appended claims, and accompanying drawings where:

DESCRIPTION

Figure 1:
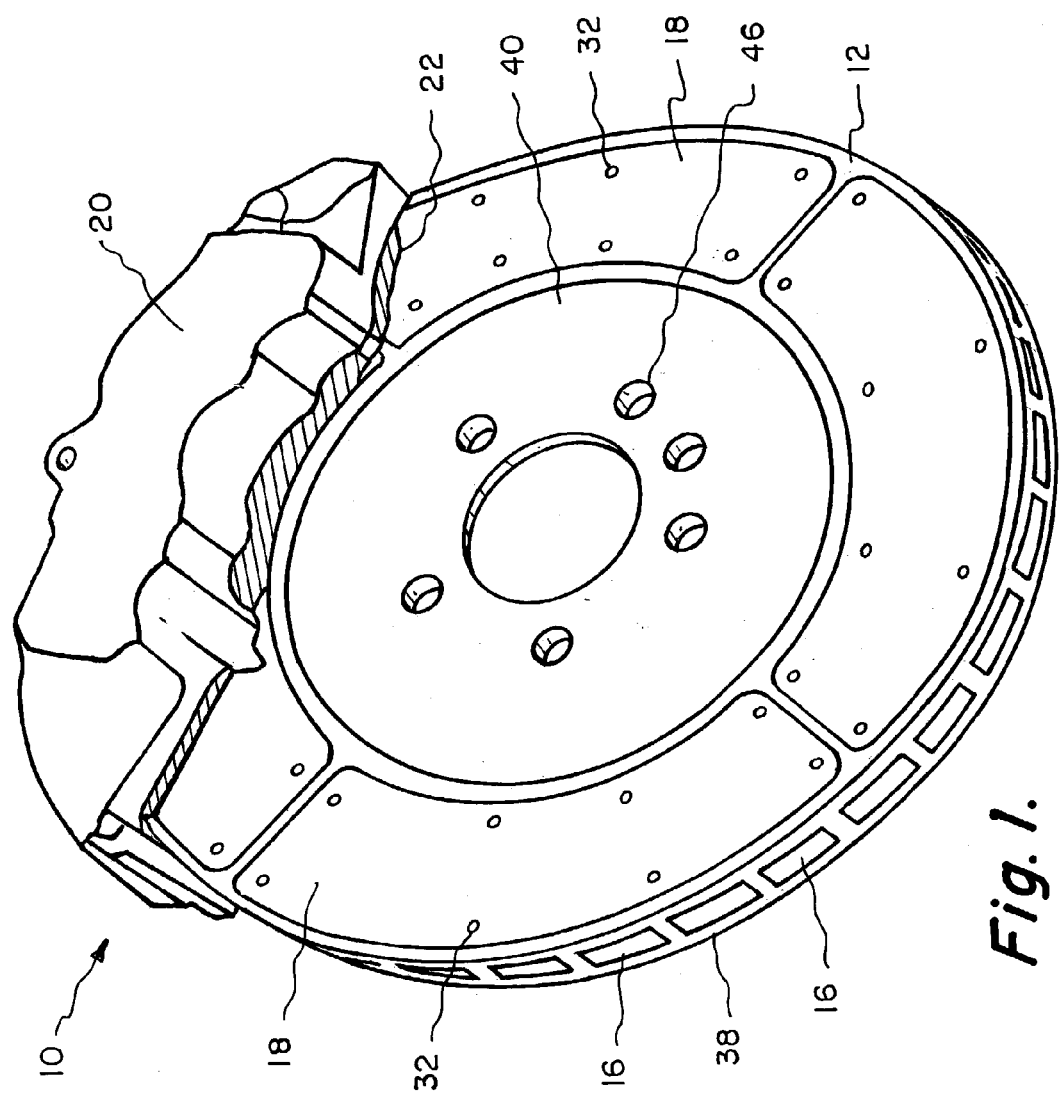
FIG. 1 is a perspective view of a disk brake, constructed in accordance with the present invention.
Figure 2:
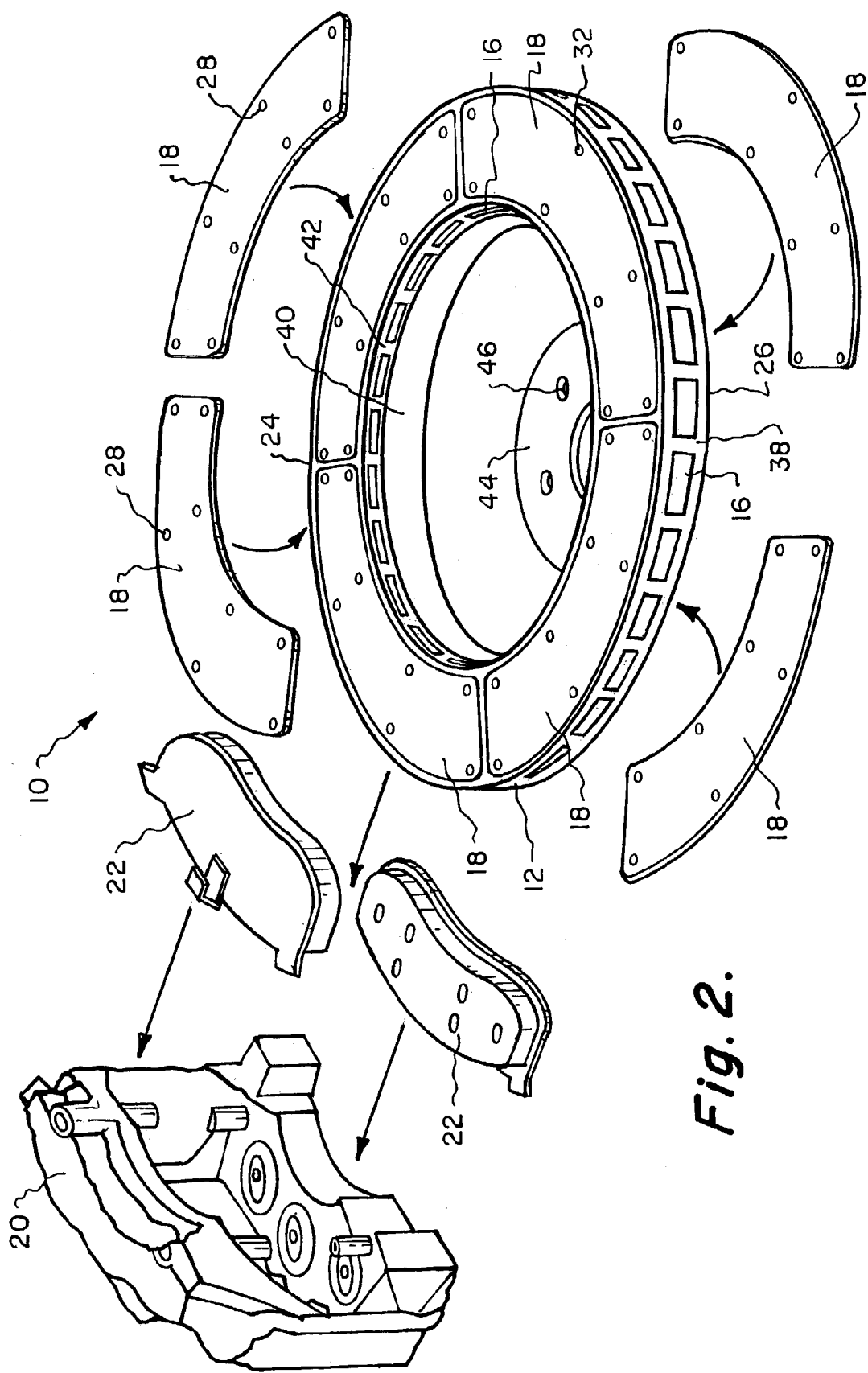
FIG. 2 is an exploded view of the disk brake of FIG. 1.
Figure 3:
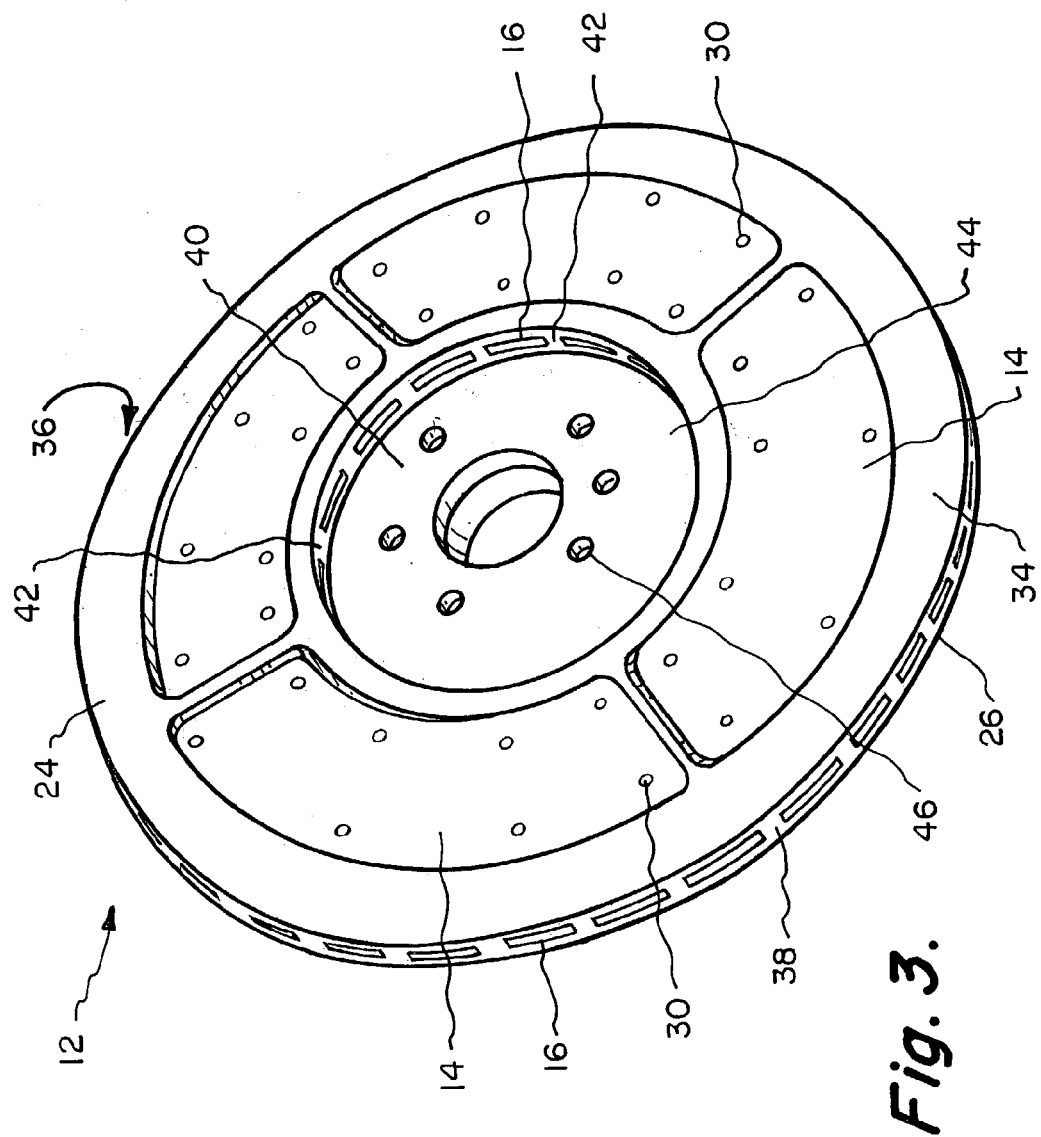
FIG. 3 is a perspective view of a brake disk of the disk brake of FIG. 1.
Figure 4:
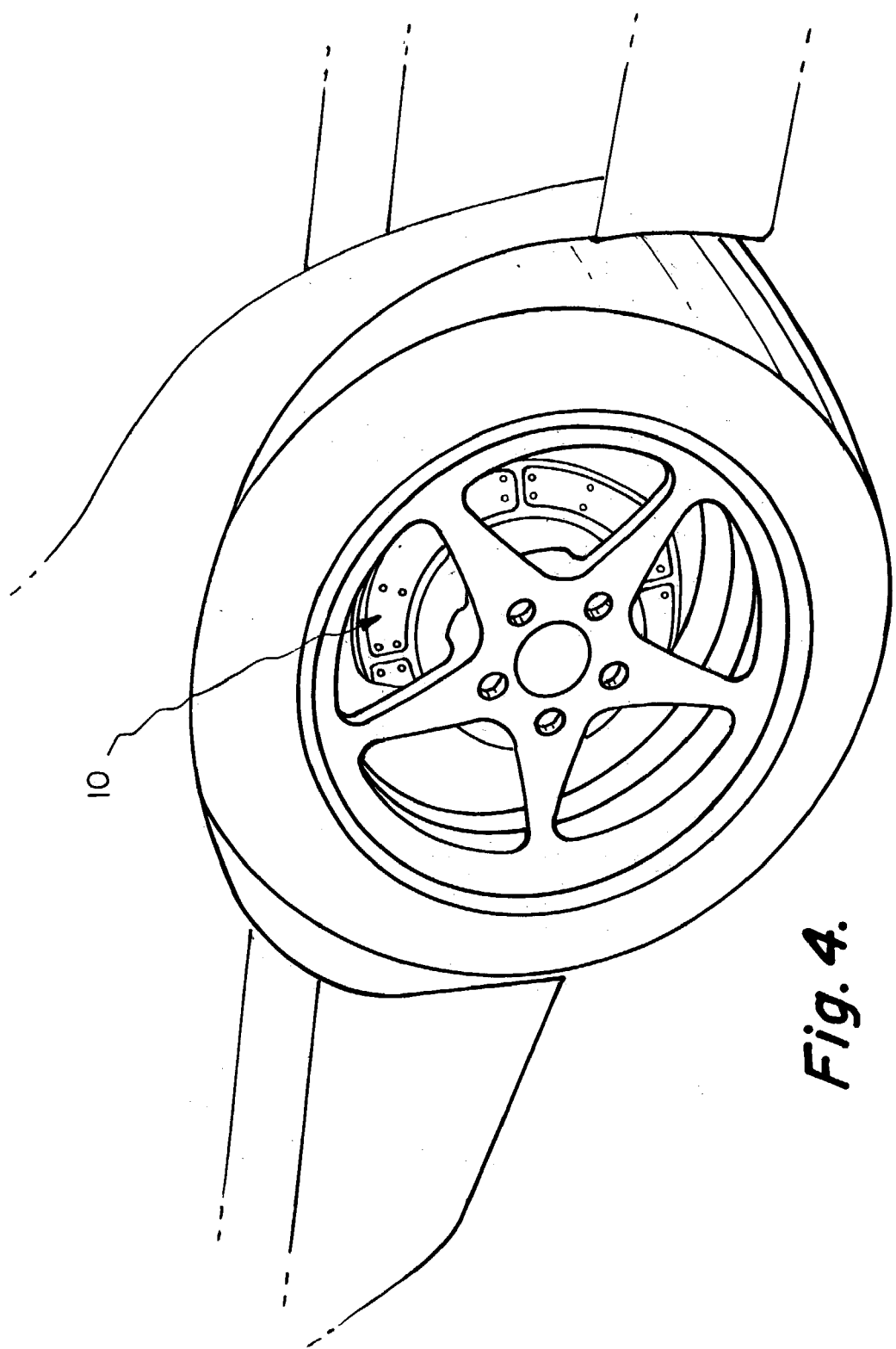
FIG. 4 is a perspective view of the disk brake of FIG. 1 mounted on an automobile.

The preferred embodiments of the present invention will be described with reference to FIGS. 1–5 of the drawings. Identical elements in the various figures are identified with the same reference numbers.

FIGS. 1–4 show an embodiment of the present invention, a disk brake 10 comprising a brake disk 12 having a plurality of coaxially disposed arcuate shaped recesses 14 and a plurality of radially disposed channels 16 therethrough, the arcuate shaped recesses for matingly receiving arcuate shaped pads 18, which are preferably of carbon—carbon material or other suitable material. The disk brake 10 also has a caliper 20 having caliper pads 22, for controllably applying friction thereto the arcuate shaped pads 18, which are adjacent and therebetween the caliper pads 22, the caliper pads 22 also preferably of carbon—carbon material or other suitable material.

The brake disk 12 has opposing sides 24 and 26, having the coaxially disposed arcuate shaped recesses 14, the arcuate shaped pads 18 matingly mounted therein. The arcuate shaped pads 18 have countersunk holes 28, and the brake disk 12 has threaded receiving holes 30 for receiving screws 32 or other suitable fasteners, and fastening the arcuate shaped pads 18 thereto the brake disk 12, the arcuate shaped pads 18 extending above surfaces 34 and 36 of the opposing sides 24 and 26 of the brake disk 12, respectively. The brake disk 12 has circumferential outer edge 38, and axially disposed circular hole 40 therethrough, which forms inner edge 42, the radially disposed channels 16 therebetween the circumferential outer edge 38 and the inner edge 42. The brake disk 12 is mounted thereto cup shaped mount 44, the brake disk 12 and the cup shaped mount 44 conjoined together, and being preferably of one piece construction, for structural integrity, the brake disk 12 having holes 46 for placing suitable fasteners therethrough, and mounting the brake disk 12 on a suitable shaft, axle, rotating member, or other device, that braking torque is to be applied thereto. The a caliper 20 having the caliper pads 22 may be mounted thereto a suitable structural portion of an automobile, transportation device, motorized, engine driven, or free wheeling device, the brake disk 12 having the arcuate shaped pads 18 being placed adjacent and therebetween the caliper pads 22 of the a caliper 20.

The arcuate shaped pads 18 of carbon—carbon material, or other suitable material, mounted therein the arcuate shaped recesses 14 provide the disk brake 10 with improved braking efficiency, eliminate warping, even under severe conditions, and make the disk brake 10 light weight, durable, long lasting, and capable of being manufactured or retrofit with replacement parts quickly, easily, and efficiently. The a caliper 20 having caliper pads 22 also of carbon—carbon material, or other suitable material, enhances these characteristics.

The brake disk 12 may be of metal, such as titanium, aluminum, aluminum alloy, stainless steel, steel, ductile iron, cast iron, or other suitable material, or other suitable material, the radially disposed channels 16 therethrough the brake disk 12 providing additional heat dissipation, increased structural integrity, with lighter weight, and decreased warpage of the brake disk 12.

Figure 5:
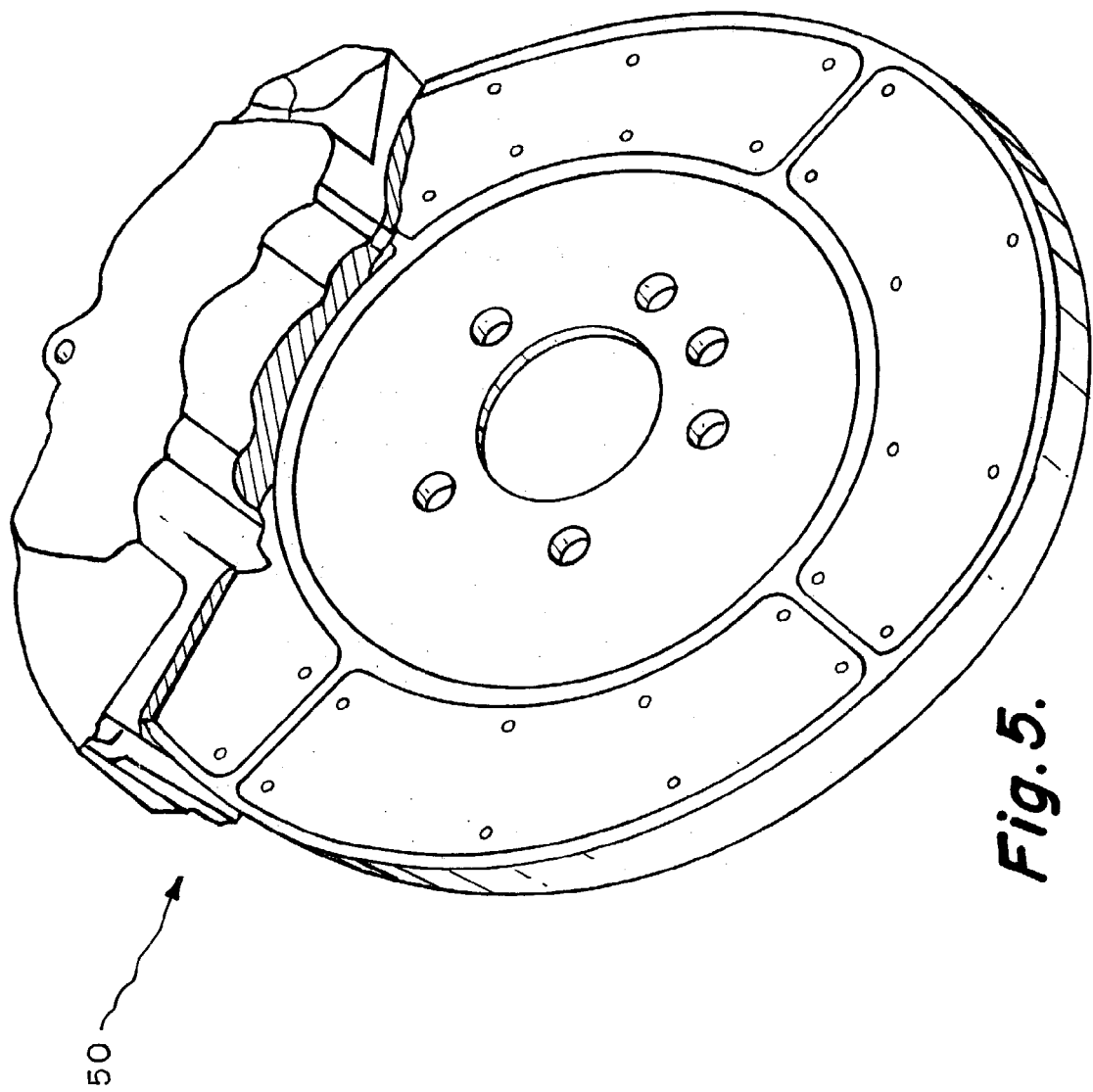
FIG. 5 is a perspective view of an alternate embodiment of a disk brake, constructed in accordance with the present invention.

FIG. 5 shows an alternate embodiment of a disk brake 50, which is substantially the same as the disk brake 10, except that the disk brake 50 is constructed without the radially disposed channels 16; however, additional heating of the disk brake 10 would be expected, which may be acceptable in certain circumstances.

Although the present invention has been described in considerable detail with reference to certain preferred versions thereof, other versions are possible. Therefore, the spirit and scope of the appended claims should not be limited to the description of the preferred versions contained herein.

What is claimed is:

1. A disk brake, comprising:
   a disk, of one piece construction, comprising two sides having a plurality of coaxially disposed arcuate shaped recesses and a plurality of radially disposed channels, said disk having an outer edge and an axially disposed hole therethrough, said hole defining an inner edge, which opposes said outer edge, said radially disposed channels extending through said disk from said outer edge to said inner edge;
   arcuate shaped pads matingly mounted in said arcuate shaped recesses and extending above a surface of said disk
   a caliper comprising caliper pads, said caliper pads operatively contacting said arcuate shaped pads.

2. The disk brake according to claim 1, wherein said arcuate shaped pads are of carbon—carbon material.

3. The disk brake according to claim 1, wherein said radially disposed channels are internal to said disk.

4. The disk brake according to claim 1, wherein said disk is of metal from the group consisting of titanium, aluminum, aluminum alloy, stainless steel, steel, ductile iron, and cast iron.

5. The disk brake according to claim 1, wherein said disk brake further comprises a mount conjoined to said disk.

6. The disk brake according to claim 1, wherein each said side has a said surface, said arcuate shaped pads extending above said surfaces.

7. The disk brake according to claim 1, wherein said inner edge and said outer edge are substantially transverse to said sides.

8. The disk brake according to claim 1, wherein said caliper pads are of carbon—carbon material.

9. The disk brake according to claim 2, wherein said caliper pads are of carbon—carbon material.

10. A disk brake, comprising:
   a disk, of one piece construction, comprising opposing sides and a plurality of radially disposed channels;
   each said side having a surface and a plurality of coaxially disposed arcuate shaped recesses;
   said disk having an outer edge and an axially disposed hole therethrough, said
   hole defining an inner edge, which opposes said outer edge,
   said radially disposed channels extending through said disk from said outer edge to said inner edge;
   arcuate shaped pads matingly mounted in said arcuate shaped recesses, said arcuate shaped pads extending above said surfaces;
   a caliper comprising caliper pads, said caliper pads operatively contacting said arcuate shaped pads.

11. The disk brake according to claim 10, wherein said arcuate shaped pads are of carbon—carbon material.

12. The disk brake according to claim 10, wherein said radially disposed channels are internal to said disk.

13. The disk brake according to claim 10, wherein said inner edge and said outer edge are substantially transverse to said opposing sides.

14. The disk brake according to claim 10, wherein said disk is of metal from the group consisting of: titanium, aluminum, aluminum alloy, stainless steel, steel, ductile iron, and cast iron.

15. The disk brake according to claim 10, wherein said disk brake further comprises a mount conjoined to said disk.

16. The disk brake according to claim 10, wherein said caliper pads are of carbon—carbon material.

17. The disk brake according to claim 11, wherein said caliper pads are of carbon—carbon material.

* * * * *